May 19, 1964
S. EIDENSOHN
3,133,837
FUEL CELL SYSTEM
Filed Dec. 31, 1959
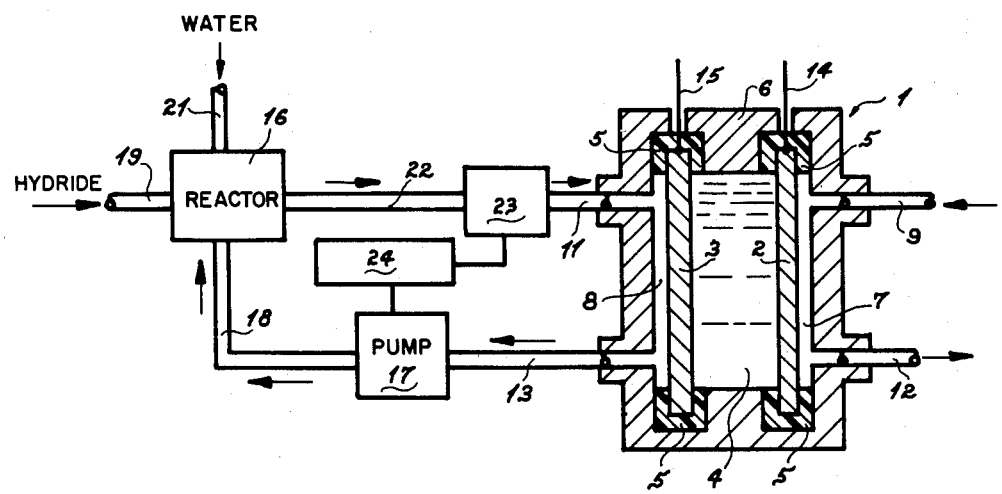
INVENTOR.
SAMUEL EIDENSOHN
BY
Robert J. Staples
ATTORNEY 3,133,837
FUEL CELL SYSTEM
Samuel Eidensohn, Riverton, N.J., assignor to The Electric Storage Battery Company, a corporation of New Jersey
Filed Dec. 31, 1959, Ser. No. 863,161
8 Claims. (Cl. 136—86)

This invention generally relates to improvements in fuel cells adapted for the direct conversion of chemical energy into electrical energy. More particularly, the present invention is concerned with a fuel cell system which utilizes gaseous hydrogen as the anodic fuel.

It is a general object of the present invention to provide a new and improved energy conversion system utilizing a fuel cell of the type consuming hydrogen as the anodic material in novel combination with means for generating the hydrogen consumed in the fuel cell.

A fuel cell may be considered as a primary battery having means for replenishing the electrochemically active materials of the couple. Like a battery, a fuel cell consists of an anode at which oxidation takes place, an electrolyte, and a cathode at which an oxidizing agent is reduced. The most commonly used oxidizing agent for fuel cells is gaseous oxygen either in the pure form or in the form of air and the most commonly used anodic material is gaseous hydrogen. While in conventional primary cells metallic electrodes are gradually dissolved in the electrolyte, in the fuel cell the electrodes are saturated with liquid or gaseous fuels and these are consumed while the electrodes remain unchanged. In the operation of an oxygen-hydrogen fuel cell, for example, the electrodes are saturated with hydrogen and oxygen respectively and these gases are consumed rather than the electrodes.

In the operation of an oxygen-hydrogen fuel cell, oxygen molecules are adsorbed on the surface of the positive electrode; this adsorbed layer of gas is more active than molecular oxygen and is free to combine with the water present, forming two hydroxyl ions; hydroxyl ions have a single negative charge, so that each ion as it is formed removes one electron from the oxygen electrode. Each hydroxyl ion migrates into the electrolyte and travels across to the negative electrode where it combines with the hydrogen adsorbed on that electrode to form water, depositing an electron in the process. Since the hydrogen electrode is now negatively charged with respect to the oxygen electrode, a current will flow in the external circuit. The theoretical voltage of the cell is simply the free energy of the reaction per gram-mole of water formed at the temperature and pressure used, divided by 2F (where F is the Faraday or 96.500 coulombs), the charge carried across the cell in the formation of this amount of water. The formation of water inherent in the operation of the fuel cell generally results in the continuous dilution of the electrolyte. Accordingly, means are generally provided in fuel cell systems to maintain the concentration of the electrolyte constant.

It is an object of the present invention to provide a fuel cell system in which the electrolyte concentration is automatically maintained constant.

It is another object of the present invention to provide in a fuel cell system of the type in which hydrogen is utilized as the anodic fuel to utilize the water produced during cell operation to generate hydrogen for consumation in the fuel cell.

It is still another object of the present invention to provide new and improved means for controlling the operation of a hydrogen consuming fuel cell.

In accordance with the present invention the water formed in the fuel cell reaction is fed back into a reactor in which a metallic hydride is decomposed thereby to liberate hydrogen for consumption in the fuel cell. This is accomplished by means including a closed circuit between the reactor and the cell from which hydrogen is recycled. As the hydrogen flows over the back fuel cell anode, it picks up water vapor and is pumped back to the reactor where the water vapor reacts with the metal hydride to generate more hydrogen. Since the rate at which the reaction takes place in the reactor is proportional to the water formed in fuel cell by the consumption of hydrogen, the system is inherently adapted for control by suitable pressure means.

A better understanding of the present invention may be had from the following description when read with reference to the accompanying drawing which is a schematic diagram of the fuel cell system of the present invention.

Referring now to the drawing, the numeral 1 indicates a fuel cell which includes a pair of electrodes 2 and 3. Electrodes 2 and 3 form walls of a chamber 4 filled with electrolyte. Electrolyte in the chamber 4 is preferably an alkaline electrolyte such as an aqueous solution of sodium-hydrogen or potassium hydrogen. The electrodes 2 and 3 are porous conductive bodies preferably treated so as to have hydrophobic characteristics. The electrodes 2 and 3 are supported between gaskets 5 fitted into suitable recesses in the cell container 6. As shown, the gasket 5 supports the electrodes 2 and 3 in such a manner as to provide gas chambers 7 and 8 between the outer surfaces of the electrodes and the respective inner surfaces of the walls of the container 6. The fuel gases to be consumed in the fuel cell 1 are introduced into the gas chambers 7 and 8 by means of inlet lines 9 and 11 respectively. Fuel gas discharge passages from the gas chambers 7 and 8 are respectively connected to exhaust lines 12 and 13. Electrical connections between the electrodes 2 and 3 are provided by the conductors 14 and 15 respectively which pass through the gaskets 5. The inlet line 9 is provided for a flow of oxygen for any suitable source of supply while the inlet line 11 is provided for a flow of hydrogen which in accordance with the present invention will be provided from a reactor 16 in a manner to be described in greater detail hereinafter. It should be noted that the exhaust line 12 may be closed if pure oxygen is utilized as the cathodic fuel.

As will be understood by those skilled in the art, the manner in which the free energy of the chemical reaction between the gases and the electrolyte is directly converted into electricity may be expressed by the following equations:

*At the Oxygen Electrode 2*

$$O_2 + 2H_2O + 4e \rightarrow 4(OH)- \qquad (1)$$

When oxygen is supplied through supply line 9 hydroxyl ions are formed within the electrolyte. In forming such ions, there is utilized an electron, thus leaving the electrode 2 positively charged or with a deficiency of electrons. The negatively charged hydroxyl ions are diffused through the electrolyte, or migrate through the electrolyte to the hydrogen electrode 3.

*At the Hydrogen Electrode 3*

$$4(OH)^- + 2H_2 \rightarrow 4H_2O + 4e \qquad (2)$$

With hydrogen flowing to the electrode 11, the hydrogen is ionized. It reacts with the hydroxyl ions to form water with release of electrons. Accordingly, with conductors 14 and 15 connected to an external circuit, current will flow. Thus, the fuel reactions are dependent upon the flow of electrons from the hydrogen electrode 3 through the external circuit to the oxygen electrode 2. In accordance with a generally recognized convention, the oxygen electrode 2 from the standpoint of the external circuit may be considered as the positive electrode, and the hydrogen electrode 3 as the negative electrode.

As mentioned hereinbefore, the electrodes 2 and 3 are porous conductive bodies which have preferably been treated to enhance their hydrophobic characteristics. As will be understood by those skilled in the art, the electrodes may comprise porous bodies of graphite which have been activated with suitable catalytic agents to improve the efficiency of the electrode reactions described above. By way of example, silver has been found to be a suitable catalyst for the oxygen electrode 2 and palladium and other metals of the platinum group have been found to be suitable catalysts for promoting the reaction which takes place in the hydrogen electrode 3.

As can be seen from the inspection of Equation 2 above, water is formed in the reaction which takes place at the hydrogen electrode. In operation, hydrogen circulating through the gas chamber 8 in back of the hydrogen electrode picks up water vapor which passes through the porous surface of the electrode 8. In accordance with the present invention, this water is utilized to generate hydrogen in the reactor 16 for consumption in the fuel cell. To this end, the mixture of hydrogen and water vapor exhausted from the gas chamber 8 by means of the discharge line 13 is pumped by means of a suitable pumping means 17 and conduit 18 into the reactor 16.

The reactor 16 is adapted for the generation of hydrogen through a reaction between the water recycling from the fuel cell 1 and a suitable metallic hydride. Hydrides found suitable for the purpose are magnesium hydride, calcium hydride, sodium hydride, potassium hydride and lithium hydride. Of these hydrides, magnesium hydride and calcium hydride are the preferred reactants inasmuch as each molecule of these hydrides contains 2 hydrogen atoms. The hydride to be consumed in the reactor 16 is introduced by way of an input line 19 as by means of an extruder and is preferably in finely divided form. As stated hereinbefore, the water for the reaction with the metal hydride is obtained from the water produced in the operation of the fuel cell. To initiate reactor operation, however, water is introduced therein by means of an input line 21. Hydrogen generated in the reactor 16 is supplied to the fuel cell by means of the conduit 22 through the pressure regulator 23 and the inlet line 11. The reaction between magnesium hydride and water is typical for the hydrogen producing reaction of the reactor 16. The equation for this is as follows:

$$MgH_2 + 2H_2O \rightarrow Mg(OH)_2 + 2H_2 \qquad (3)$$

The hydrogen produced by this reaction is fed into the anode of the hydrogen-oxygen cell where it is consumed. The fuel cell reaction can be written as follows by combining the Equations 1 and 2:

$$2H_2 + O_2 \rightarrow 2H_2O + 107.2 AH \qquad (4)$$

Accordingly the overall reaction for the system is:

$$MgH_2 + O_2 \rightarrow Mg(OH)_2 + 107.2 AH \qquad (5)$$

As noted hereinbefore, the reaction of Equation 5 is accomplished by means of the closed circuit formed between the reactor and the fuel cell in which the hydrogen is recycled.

In the operation of the system the only control needed is that on the rate of flow of the hydrogen. If this flow is too rapid, the hydrogen passing through the gas chamber 8 will absorb too much water vapor which will in turn increase the hydrogen generation rate and the hydrogen pressure in the system will rise. If, on the other hand, the hydrogen flow is insufficient, not enough water vapor will be absorbed by the hydrogen passing through the gas chamber 8 which will result in a decrease of hydrogen pressure. Accordingly, it is possible to control the system by sensing the pressure of the hydrogen and utilizing that pressure to control the operation of the pump 17. To this end, the pressure regulator 23 in the input line to the fuel cell 1 is adapted through control means 24 to control the operation of the pump 17. In this manner, the control of the fuel cell becomes automatic.

Thus, in the manner described hereinbefore, the present invention provides a novel means for controlling the operation of a hydrogen consuming fuel cell. In addition, by utilizing the closed circuit system described, the water produced during fuel cell operation is recycled for reaction with a metallic hydride to generate the hydrogen for fuel cell consumption and the concentration of the electrolyte remains constant. It should also be noted from Equation 3 that nine grams of water are needed for each gram of hydrogen produced and a total of sixty-one grams of reactant are needed to produce four grams of hydrogen. By recycling it is only necessary to consume twenty-five grams of reactant which is a saving of nine grams per gram of hydrogen produced. While the system of the present invention has been described in connection with a fuel cell utilizing oxygen as a cathodic fuel, it should be understood that the teachings of the present invention are equally applicable to fuel cells utilizing other materials as the cathodic fuel.

Having described the present invention, that which is claimed as new is:

1. In combination, reactor means adapted for a generation of hydrogen by means of the reaction of a metallic hydride and water, a fuel cell utilizing hydrogen as the anodic material, means for supplying the hydrogen produced in said reactor to said fuel cell, and means for recycling hydrogen exhausted from said fuel cell to said reactor, said exhausted hydrogen containing water vapor produced in said fuel cell operation, said water vapor in turn being utilized in the reaction of the reactor.

2. The combination as specified in claim 1 wherein said last-named means includes a pumping means controlled in respect to the pressure of the hydrogen in the system.

3. In combination, reactor means adapted for a generation of hydrogen by means of the reaction of a metallic hydride and water, a fuel cell utilizing hydrogen as the anodic material, means for supplying the hydrogen produced in said reactor to said fuel cell, part of said hydrogen being consumed in said fuel cell and the remainder of said hydrogen absorbing water produced in the fuel cell operation being exhausted from said fuel cell, and means for recycling hydrogen exhausted from said fuel cell to said reactor, the water vapor in said hydrogen being utilized for reaction with a metallic hydride.

4. A combination as specified in claim 3 wherein said last-named means includes a pumping means controlled in accordance with the pressure of the hydrogen in the system.

5. In combination, a reactor adapted for the generation of hydrogen by means of the reaction of a metallic hydride and water, said metallic hydride being selected from the group consisting of magnesium hydride, calcium hydride, sodium hydride, potassium hydride and lithium hydride, a fuel cell utilizing hydrogen as the anodic material, means for supplying the hydrogen produced in said reactor to said fuel cell, part of said hydrogen being consumed in said fuel cell and the remainder of said hydrogen absorbing water produced in the fuel cell operation being exhausted from said fuel cell, and means for recycling hydrogen exhausted from said fuel cell to said reactor, the water vapor in said hydrogen being utilized for reaction with a metallic hydride.

6. A combination as specified in claim 5 wherein said last-named means includes a pumping means controlled in respect to the pressure of the hydrogen in the system.

7. A combination as specified in claim 5 wherein said fuel cell is an oxygen-hydrogen fuel cell.

8. In combination, reactor means adapted for the generation of hydrogen by means of the reaction of water and a hydride selected from the group consisting of alkali metal hydrides and alkaline earth metal hydrides, a fuel cell including a chamber containing an anode and cathode, means for supplying the hydrogen produced in said reactor to said anode of said fuel cell, and means for recycling hydrogen exhausted from said fuel cell to said reactor, said exhausted hydrogen containing water vapor produced in said fuel cell operation, said water vapor in turn being utilized in the reactor.

References Cited in the file of this patent

UNITED STATES PATENTS

| | | |
|---|---|---|
| 2,913,511 | Grubb | Nov. 17, 1959 |
| 2,925,455 | Eidensohn et al. | Feb. 16, 1960 |